Patented Oct. 7, 1924.

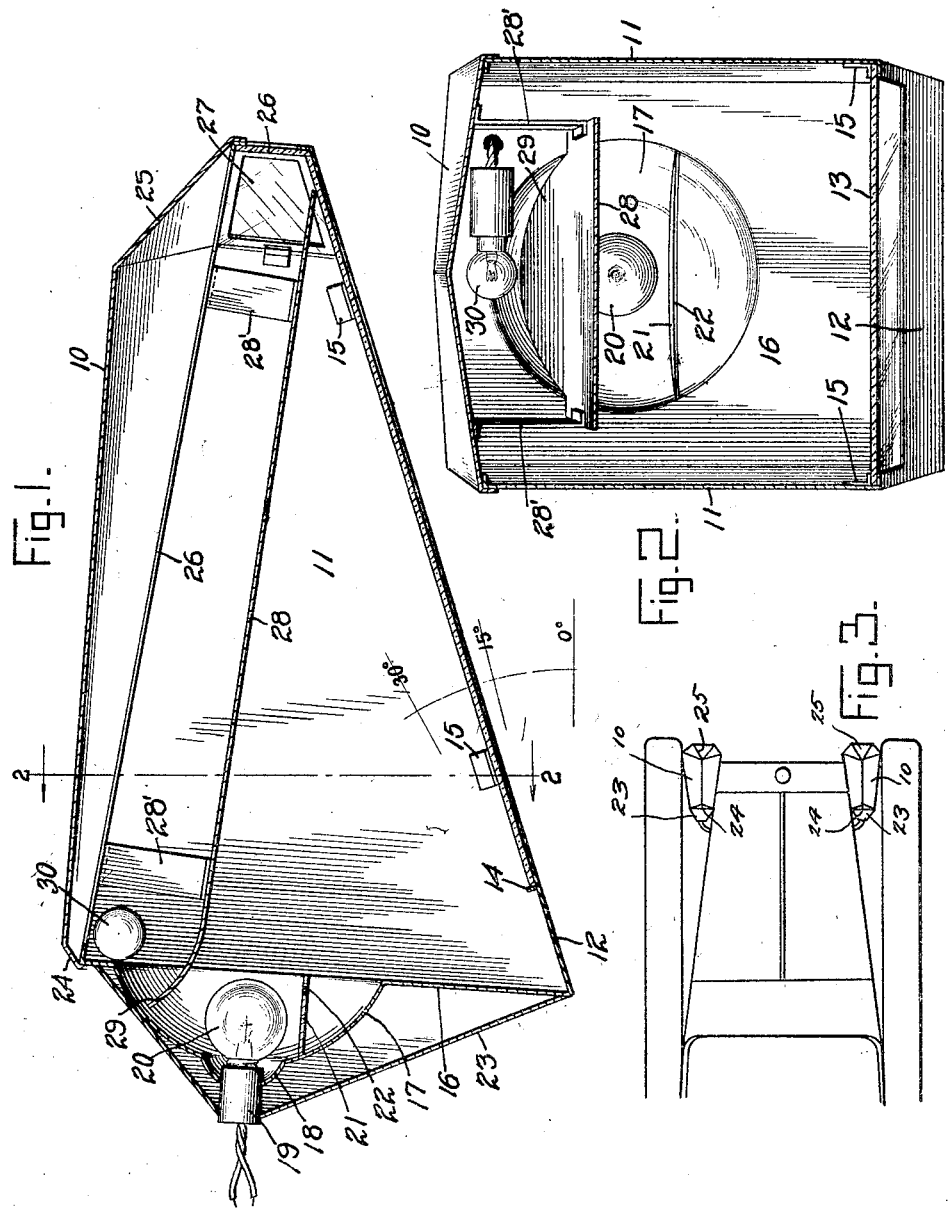

1,511,117

UNITED STATES PATENT OFFICE.

WINFIELD R. DU BREUIL, OF CHICAGO, ILLINOIS.

AUTOMOBILE HEADLIGHT.

Application filed February 18, 1922. Serial No. 537,576.

*To all whom it may concern:*

Be it known that I, WINFIELD R. DU BREUIL, a citizen of the United States, residing at Chicago, in the county of Cook and State of Illinois, have invented certain new and useful Improvements in Automobile Headlights, of which the following is a specification.

My said invention relates to an automobile headlight the general construction of which is similar to that shown in my application No. 527,723, filed January 7, 1922.

It is an object of the present invention to still further eliminate the dangerous and offensive glare frequently observed in automobile headlights.

A further object is to provide a more effective form of "dim" light.

Referring to the accompanying drawings which are made a part hereof and on which similar reference characters indicate similar parts, Figure 1 is a longitudinal central section of my device, Figure 2 is a transverse section on line 2—2 of Figure 1, and Figure 3 a plan view of a portion of a vehicle with the headlights attached thereto.

In the drawings reference character 10 indicates the upper member or roof of the headlight, having secured thereto side members 11. A bottom member 12 is attached to the side members in any convenient manner and this member is cut away for the greater part of its length and width to provide an opening which is here shown as covered by a sheet 13 of glass or other transparent material held in place in any convenient manner as by a ledge 14 at its rear end and lugs 15 projecting over it and secured to the side members. If preferred this opening may be uncovered, the purpose of the glass being mainly to exclude dust and dirt. I have found it desirable to locate the glass at an angle of approximately 18° to the horizontal, since at a lesser angle the light has a wavy appearance, due to the distortions commonly occurring in glass. The glass may be located at a greater angle if necessary, and the angle may be reduced if a better quality of glass be used.

At the rear end the casing is closed by a rear member 16 having a rearward bulge at 17 provided with a highly polished front reflecting surface. If desired the part 17 may be separately formed and set into a circular or other opening of the member 16. It may, as here shown, have a central rearward bulge 18 in which is formed a central opening for a plug 19 carrying the electric lamp 20. Below the lamp is a shelf 21 cut back at 22 for a purpose presently to be described. The bulged portions 17 and 18 may be concealed by a cover member 23 which may form an additional support for the plug 19.

The upper member 10 is preferably highest at the middle on a line extending from front to rear and slopes downward toward the sides and has also at each end short downwardly sloping portions 24 and 25, the sloping side portions of the said member joining the side members 11 along the line 26. The forward end of the casing is formed substantially as in my prior application and has a front window 26′ and a pair of corner windows 27.

A partition 28 of reflecting material extends from end to end of the casing, being spaced a little distance from the part 17 and having its forward end approximately at or slightly below the lower edge of the window 26. The partition 28 is preferably of a width substantially equal to the length of the window 26 to exclude the direct rays from the bulb 20. Preferably the partition is slightly spaced from the bottom member 12 to admit a little light, which light, however, does not come directly from the lamp as the front edge of the partition is below the lower edge of the window. The partition may be supported in any convenient manner being here shown as supported by brackets 28′ depending from the top of the casing. At its rear end the partition may be bent somewhat upwardly and have a curved formation as shown at 29 in Figure 2 whereby it may approach closely to the inner surface of the reflector 17 to keep the reflected light from lamp 20 from striking the window 26. An electric lamp 30 is supported above the partition and preferably at the rear of the casing, this lamp being arranged to be turned on when a dim light is desired, the lamp 20 being then turned off.

Figure 1 shows the position of the casing and related parts in use, the headlight being intended to be secured at about the usual distance above the road. It will be seen that light from the bright lamp 20 cannot shine directly in the eyes of pedestrians or other users of the road inasmuch as all upward rays are cut off. Preferably all the inner surfaces of the device are formed of reflecting material to secure the most efficient use of the light. The shelf 21 cuts off the bright light from the lower part of the reflector 17 but is itself cut away sufficiently to permit the lamp to throw its light without interruption downward toward the road. In this manner substantially all of the light is utilized it being directed forward and downward and practically without possibility of confusing approaching persons by its glare. Should a dim light be wanted the usual switch will be operated to cut off the light at 20 and turn it on at 30 whereby the light from the lamp 30 will shine through windows 26 and 27 sufficiently for the usual purposes of dim lights. I have found that a structure embodying some such device as the partition 28 is preferable to the headlight without the partition, which structure permits an undue amount of light to pass through window 26. By the present structure a limited amount of indirect light passes around the ends and sides of partition 28 to illuminate the windows 26 and 27 sufficiently to give notice to nearby persons or animals but not sufficiently to cause any objectionable glare.

It will be evident to those skilled in the art that various changes may be made in this device without departing from the spirit of the invention the true scope of which is shown in the appended claims.

Having thus fully described my said invention, what I claim as new and desire to secure by Letters Patent, is:

1. In a headlight, a source of illumination, a casing therefor comprising closed sides and top and an open bottom, a rear end having a concave reflecting portion surrounding the source of illumination, and a shelf on said concave portion and concealing the lower part thereof, said shelf being cut away at the front and means in advance of the source of illumination to prevent the rays of light from rising above their source, said means extending downward to the level of said shelf, substantially as set forth.

2. In a headlight, an elongated casing having an open bottom, a lower main lamp at the rear end of the casing, a concave reflector about the same, a dim lamp at the upper edge of the reflector and within the casing, a transverse shelf cutting off the light from the lower part of the reflector, and a partition extending between the lamps and having its forward end approximately on a level with said shelf, substantially as set forth.

3. In a headlight, an elongated casing having closed sides, ends and top and an open bottom, a lower main lamp and an upper dim lamp at the rear end of the casing, a partition extending between them and having its forward end below the level of the main lamp, said partition having upper and lower reflecting surfaces and a window at the front end of the casing above the partition, substantially as set forth.

In witness whereof, I have hereunto set my hand and seal at Washington, District of Columbia, this 17th day of February, A. D. nineteen hundred and twenty-two.

WINFIELD R. DU BREUIL. [L. S.]

Witnesses:
M. A. SHAW,
F. W. DAHM.